(12) United States Patent
Bellesfield et al.

(10) Patent No.: US 6,282,489 B1
(45) Date of Patent: Aug. 28, 2001

(54) METHODS AND APPARATUS FOR DISPLAYING A TRAVEL ROUTE AND GENERATING A LIST OF PLACES OF INTEREST LOCATED NEAR THE TRAVEL ROUTE

(75) Inventors: Keith J. Bellesfield, Landisville; Terry L. Campbell, Elizabethtown; Thomas P. Haskell, Lancaster; Bradley D. Sauder, New Holland, all of PA (US)

(73) Assignee: Mapquest.Com, Inc., New York, NY (US)

( * ) Notice: Subject to any disclaimer, the term of this patent is extended or adjusted under 35 U.S.C. 154(b) by 0 days.

(21) Appl. No.: 08/069,161

(22) Filed: May 28, 1993

(51) Int. Cl.[7] .................................................. G01C 21/34
(52) U.S. Cl. ........................... 701/201; 701/208; 701/209
(58) Field of Search ..................................... 304/444, 443, 304/424.02, 449, 450, 436, 448, 451, 460, 424.01; 340/990, 995, 991, 988, 825.34, 989, 992, 905, 525, 286.14; 73/178 R; 395/132–140; 701/201, 202, 208–210

(56) References Cited

U.S. PATENT DOCUMENTS

| | | | | |
|---|---|---|---|---|
| 4,301,506 | * | 11/1981 | Turco .................................. | 364/436 |
| 4,528,552 | * | 7/1985 | Moriyama et al. ................... | 340/525 |
| 4,546,439 | | 10/1985 | Esparza ............................... | 364/444 |
| 4,570,227 | * | 2/1986 | Tachi et al. ........................... | 364/444 |
| 4,646,089 | * | 2/1987 | Takanabe et al. .................... | 340/995 |
| 4,796,189 | * | 1/1989 | Nakayama et al. .................. | 364/449 |
| 4,866,626 | * | 9/1989 | Egli ...................................... | 364/449 |
| 4,876,651 | * | 10/1989 | Dawson et al. ....................... | 364/449 |
| 4,890,104 | * | 12/1989 | Takanabe et al. .................... | 340/995 |
| 4,914,605 | * | 4/1990 | Loughmiller, Jr. .................. | 395/132 |
| 4,926,336 | * | 5/1990 | Yamada ................................ | 364/444 |
| 4,937,753 | * | 6/1990 | Yamada ................................ | 364/449 |
| 4,954,958 | * | 9/1990 | Savage et al. ........................ | 364/444 |
| 4,962,458 | | 10/1990 | Verstraete ............................. | 364/443 |
| 4,984,168 | | 1/1991 | Neukrichner et al. ............... | 364/449 |
| 5,031,104 | | 7/1991 | Ikeda et al. ........................... | 364/449 |
| 5,041,983 | | 8/1991 | Nakahara et al. .................... | 364/449 |
| 5,067,081 | * | 11/1991 | Person .................................. | 364/444 |
| 5,115,399 | * | 5/1992 | Nimura et al. ....................... | 364/449 |

(List continued on next page.)

OTHER PUBLICATIONS

"Introduction to Data Structures", by B. Singh and T. Naps, pp. 215–223, Jan. 1985, West Publishing Co. of Minnesota.*
"Map Projections—A Working Manual", U.S. Geological Survey Professional Paper, Jan. 1987, U.S. Department of Interior.*

Primary Examiner—William A. Cuchlinski, Jr.
(74) Attorney, Agent, or Firm—Jenkens & Gilchrist

(57) ABSTRACT

An automated travel planning apparatus includes three separate databases, including a map database for storing bit-mapped images covering numerous geographic regions, a routing database for storing node, link, and shape data for roads geographically located within the geographic regions and for storing place data indicating the geographic location of places such as towns and cities, and a places of interest database containing the geographic locations of numerous places of interest. A processor within the automated travel planning apparatus may be divided into several functional components, including a map selection component, a routing component, and a place selection component. In response to user input at the user interface, the map selection component chooses a bit-mapped image from the map database for display on the display monitor. After a user selects, via the user interface, a departure point and a destination point, the routing component employs the routing database to generate and display a route between the selected departure and destination points. If the user requests a list of places near the displayed route, the place selection component employs the places of interest database to generate and display a list of places of interest which are within a predetermined distance of the generated route.

15 Claims, 9 Drawing Sheets

U.S. PATENT DOCUMENTS

| | | | |
|---|---|---|---|
| 5,168,452 * | 12/1992 | Yamada et al. | 364/444 |
| 5,170,353 * | 12/1992 | Verstraete | 364/444 |
| 5,172,321 * | 12/1992 | Ghaem et al. | 364/444 |
| 5,189,430 * | 2/1993 | Yano et al. | 342/457 |
| 5,191,406 * | 3/1993 | Brandestini et al. | 395/131 |
| 5,191,532 * | 3/1993 | Moroto et al. | 364/449 |
| 5,231,584 * | 7/1993 | Nimura et al. | 364/444 |
| 5,270,937 * | 12/1993 | Link et al. | 364/449 |
| 5,274,387 * | 12/1993 | Kakihara et al. | 364/449 |
| 5,293,163 * | 3/1994 | Kakihara et al. | 340/995 |

* cited by examiner

| MAP NAME | FILE NAME | INITIAL DISPLAY COORDINATES | PROJECTION | LAT/LONG OF UL CORNER | LAT/LONG OF LR CORNER |
|---|---|---|---|---|---|
| COUNTRY A | COUNTRYA.BMP | $X_1, Y_1$ | PROJ1 | LAT1, LONG1 | LAT4, LONG4 |
| STATE 1 | STATE1.BMP | $X_2, Y_2$ | PROJ2 | LAT2, LONG2 | LAT5, LONG5 |
| STATE 2 | STATE2.BMP | $X_3, Y_3$ | PROJ3 | LAT3, LONG3 | LAT6, LONG6 |
| ⋮ | ⋮ | ⋮ | ⋮ | ⋮ | ⋮ |

METHODS AND APPARATUS FOR DISPLAYING A TRAVEL ROUTE AND GENERATING A LIST OF PLACES OF INTEREST LOCATED NEAR THE TRAVEL ROUTE

FIELD OF THE INVENTION

The present invention generally relates to automated travel planning systems. More particularly, the present invention relates to an apparatus and method for displaying a travel route between a departure point and a destination point, and an apparatus and method for generating a list of places of interest geographically located near a calculated travel route between a departure point and a destination point.

BACKGROUND OF THE INVENTION

In past years, individuals planning trips by automobile, bicycle, or similar means have employed paper maps with manually-highlighted routes for assistance in traveling from a departure point to a destination point. For example, business such as travel agencies, car rental firms, automobile clubs, and travel clubs often provide individuals with booklets of maps covering the regions to be travelled by the individuals, and will manually highlight a travel route which may be taken by the individuals. A major drawback of manually-drawn routes on paper maps is that it is costly and inefficient in terms of time and money because an individual must first determine which route to take between a departure point and destination point, and must then piece together a set of paper maps which cover the region to be travelled. Furthermore, if an individual wants to know places of interest, such as hotels, restaurants, and attractions, along the route, he or she must go through the time-consuming process of determining which places of interest are geographically located near the route.

As technology has become more sophisticated, computerized mapping systems have developed for assisting individuals in travel planning. For example, U.S. Pat. No. 4,954,958 to Savage et al. discloses a directional information system for enabling a user to determine a desired geographical route between supplied locations. The system generates routing directions in a language, such as English, for output to a user via such output devices as a telephone receiver, printer, or display screen. A drawback of the Savage system is that it does not visually output the route on a displayed map or on a printer.

Other computerized mapping systems for generating a route between a departure point and a destination point have displayed the generated route on a vector map. Vector-mapping draws a map on a display screen on the fly by reading from a massive database of geographic information. The geographic information includes shape information, such as latitude and longitude coordinates, to properly draw the location of roads, highways, hydrology, cities, etc. One drawback of such a system is that it is slow because each map must be drawn on the fly. Another drawback is that it is difficult to place type on a displayed vector map on the fly without interfering with the roads, highways, hydrology, cities, etc. Yet another drawback of a vector map is that a vector map looks more like a "stick map" than like a geographically accurate paper map.

Accordingly, a need exists for an automated travel planning apparatus for overcoming the above-noted drawbacks associated with existing travel planning systems.

SUMMARY OF THE INVENTION

In accordance with the foregoing, an object of the present invention is to provide an automated travel planning apparatus and method for displaying a bit-mapped image of a selected geographic region on a display screen and for generating and displaying a travel route between a selected departure point and a selected destination point at the correct position on the bit-mapped image. As discussed later, since the bit-mapped image is a "snap-shot" of a vector map counterpart, accessing and drawing the bit-mapped image on the display screen is almost instantaneous. Moreover, creation of the bit-mapped image entails steps which allow type to be easily placed on the bit-mapped image and which allow the bit-mapped image to be a geographically accurate representation of the coverage region.

Another object of the present invention is to provide an automated travel planning apparatus and method for generating a list of places of interest near a travel route between a departure point and a destination point.

In accordance with the present invention, the foregoing objects are realized by providing a method for displaying a travel route, the method comprising the steps of providing a bit-mapped image of a geographic region on a display monitor, providing a routing database having information indicating the geographic location of roads and places within the geographic region, selecting a departure point and a destination point geographically located within the geographic region, accessing the routing database to generate a travel route between the selected departure point and the selected destination point, and displaying the travel route on the bit-mapped image on the display monitor. In a preferred embodiment, the foregoing method further includes the step of generating and displaying a list of places of interest located near the generated travel route.

BRIEF DESCRIPTION OF THE DRAWINGS

Other objects and advantages of the invention will become apparent upon reading the following detailed description and upon reference to the accompanying drawings, in which.

Figure 1:
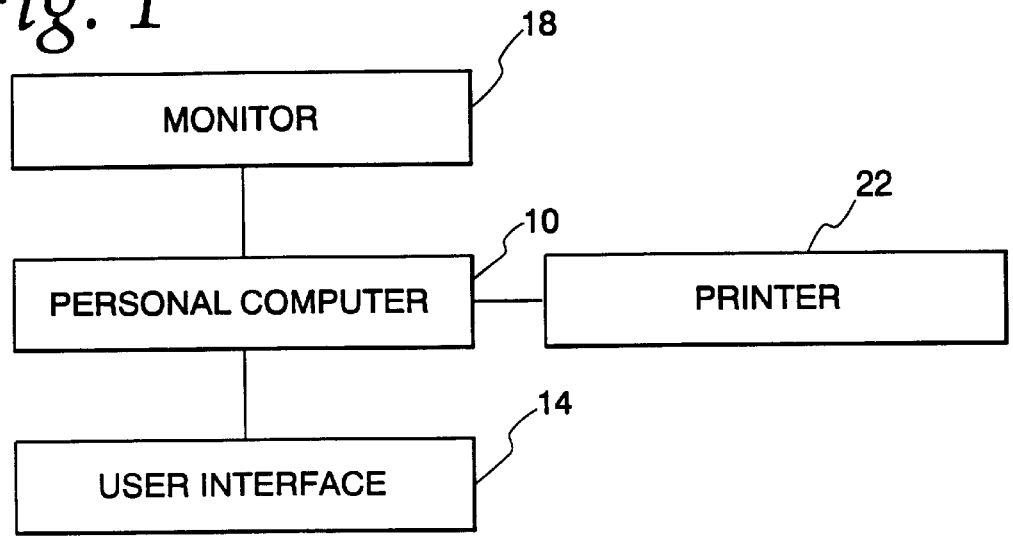
FIG. 1 is a block diagram of the system context of the present invention.

While the invention is susceptible to various modifications and alternative forms, a specific embodiment thereof has been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENT

Turning now to the drawings, FIG. 1 illustrates the system context of the automated travel planning apparatus embodying the present invention. In the preferred embodiment, the automated travel planning apparatus is executable on a personal computer 10, running a graphical user interface such as Microsoft Windows™ 3.0 or higher on top of the MS-DOS operating system, which includes an 80386 or higher processor, four or more megabytes of RAM, three or more megabytes of available hard disk space, and VGA or higher graphics capability. The personal computer 10 also includes a user interface 14 having a manually-operated keyboard and a mouse. The personal computer 10 is connected to a display monitor 18 for visual output and to a laser printer 22, if desired, for printed output.

Figure 2:
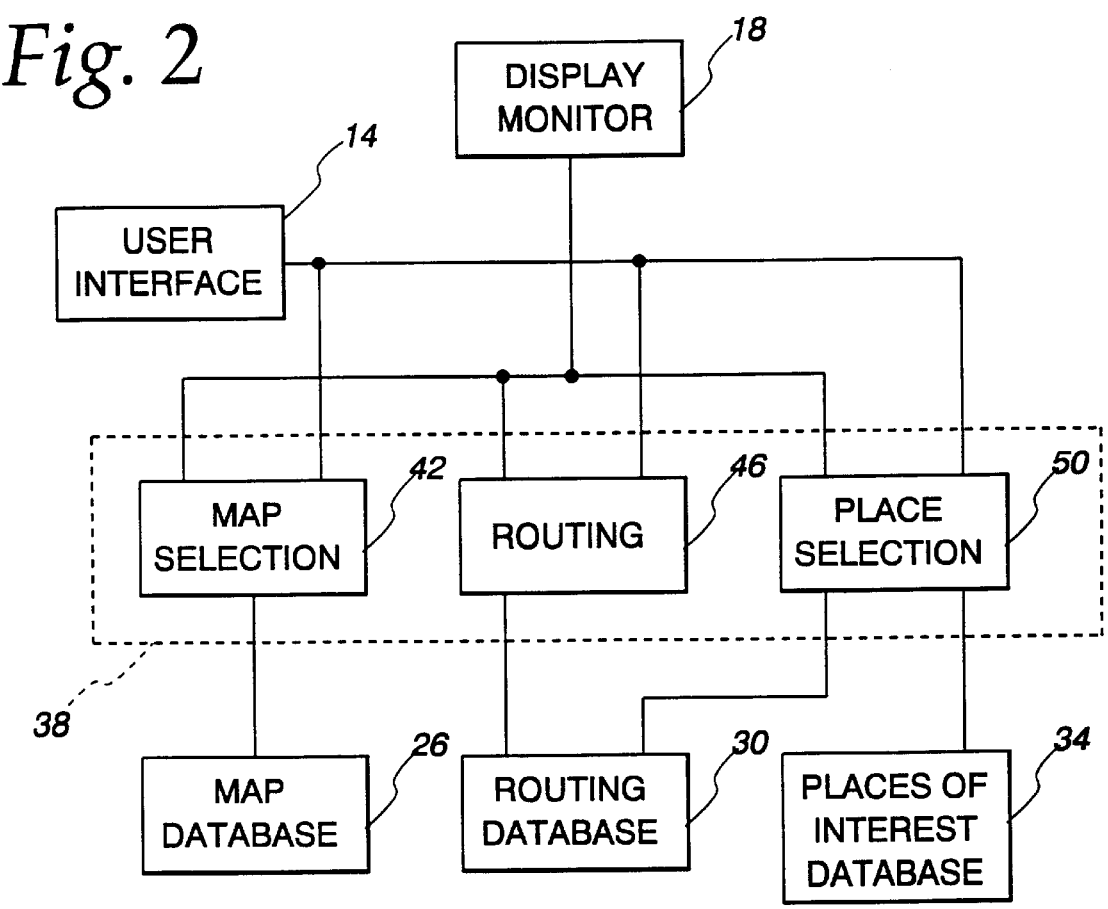
FIG. 2 is a block diagram of an automated travel planning apparatus embodying the present invention.

FIG. 2 illustrates a block diagram of the automated travel planning apparatus embodying the present invention. The apparatus employs three separate databases, including a map database 26 for storing bit-mapped images of numerous geographic regions, a routing database 30 for storing node and link data for roads geographically located within the geographic regions and for storing place data indicating the geographic location of places such as towns and cities, and places of interest database 34 containing the geographic locations of numerous places of interest. A processor 38 within the automated travel planning apparatus may be divided into several functional components, including a map selection component 42, a routing component 46, and a place selection component 50. In response to user input at the user interface 14, the map selection component 42 chooses a bit-mapped image from the map database 26 for display on the display monitor 18. After a user selects, via the user interface 14, a departure point and a destination point, the routing component 46 employs the routing database 40 to generate a route between the selected departure and destination points. The generated route is displayed on the display monitor 18. If the user requests a list of places near the displayed route, the place selection component 50 employs the places of interest database 34 to generate and display a list of places of interest which are within a predetermined distance of the generated route. Each of the blocks in FIG. 2 are described in greater detail below.

Figures 3, 4:
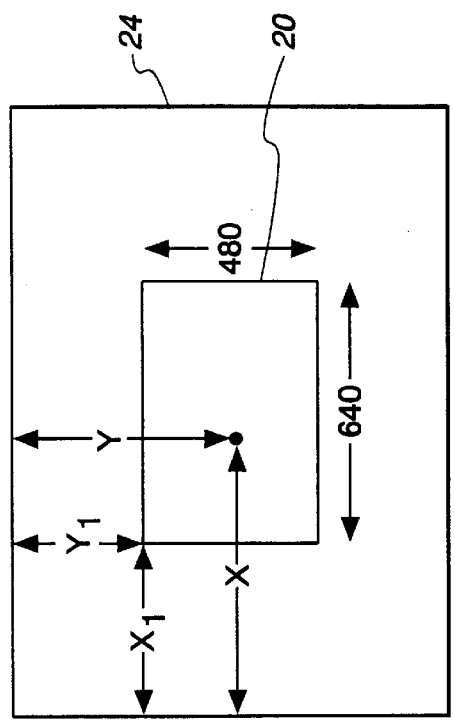
FIG. 3 is a data structure diagram for the map database of the automated travel planning apparatus of FIG. 2.
FIG. 4 is a diagram illustrating the display offset of a bit-mapped image relative to a display screen, in accordance with the "initial display coordinates" in the data structure of FIG. 2.

The map database 26 has stored therein bit-mapped images for both high and low level geographic regions. For example, one bit-mapped image covers an entire country such as the United States, while other bit-mapped images cover individual regions (e.g., states) within the country. These bit-mapped images are stored in accordance with the data structure shown in FIG. 3. The data structure fields include "map name", "file name", "initial display coordinates", "projection", "lat/long of upper left (ul) corner", and "lat/long of lower right (lr) corner". When a bit-mapped image is displayed on the display monitor 18 with a display screen 20, the "initial display coordinates" position the bit-mapped image relative to the display screen 20 as shown in FIG. 4. For example, if the "initial display coordinates" are X1, Y1 and the display screen has a resolution of 640×480 pixels, then the bit-mapped image 24 will be initially displayed with the bit map coordinates X1, Y1 of the bit-mapped image 24 located at the upper left corner pixel of the display screen 20. These bit map coordinates X1, Y1 are used to find the pixel on the display screen 20 which corresponds to a point X, Y on the bit-mapped image 24. In particular, if X1<X<(X1+640) and Y1<Y<(Y1+480), then the bit map coordinates X, Y will fall within the boundaries of the display screen 20 and will correspond to pixel position (X−X1), (Y−Y1) on the display screen 20.

The bit-mapped images are created using a conventional digital cartographic process. In the digital cartographic process, a vector map is first created from Geographic Information System (GIS) data, known as TIGER line data, available on nine-track tapes from the Census Bureau of the United States government. The TIGER line data includes information about most road segments (hereafter "links") within the entire United States, including link name, alternate names for a given link, the type of link (e.g., interstate, highway, limited access, state route, etc.), and the shape of the link. The shape information for a given link includes the latitude and longitude (hereafter "lat/long") of the end points (hereafter "nodes") and intermediate shape points of the link. The TIGER line data is organized in flat files interrelated by record numbers.

After obtaining the TIGER line data on the nine-track tapes, the data is first loaded into a GIS database, such as ARC-INFO™ by ESRI, Inc. of Redlands, Calif. Next, the data in the GIS database is formatted for loading into an Apple Macintosh computer which is running vector-based drawing software, such as Adobe Illustrator by Adobe Systems, Inc. of Mountain View, Calif., where the GIS data is used to display vector maps by applying industry standard map projections. Map projections allow one to display a curved map on a relatively flat surface such as a paper map or a computer display monitor. Standard map projection formulas are described in detail in the book entitled Map Projections—A Working Manual, A U.S. Geological Survey Professional Paper, published by the U.S. Department of Interior in 1987, which is incorporated herein by reference.

Since the aesthetic quality of the vector maps is relatively low, a cartographer significantly improves the quality by modifying the vector maps. The modifications typically include smoothing out the shape of roads, adding water regions using map sources such as paper maps, adding political boundaries for states, cities, etc., and coloring and shading certain areas. The modified vector maps are saved in Adobe Illustrator as PREVIEW images. These PREVIEW images are "snap-shot" bit map counterparts to the vector maps, and these bit-mapped images incorporate the modifications which improve the appearance and geographic accuracy of the bit-mapped images relative to the vector maps.

A series of PICT images are created from the PREVIEW images using commercially-available software such as CAPTURE™ 4.0 by Mainstay of Agoura Hills, Calif. These PICT images are converted to IBM-compatible format using commercially-available software such as PICTure This™ by FGM, Inc. of Herndon, Va., and the IBM-compatible images are actually transferred from an Apple Macintosh computer to an IBM-compatible computer using a local area network (LAN) or commercially-available software such as Apple File Exchange. The map database 26 is comprised of these transferred IBM-compatible images.

An advantage of accessing a bit-mapped image to display a given geographic region, as opposed to accessing the appropriate GIS data to display a vector map of the region on the fly, is that access and display of the bit-mapped image is almost instantaneous while access of the GIS data and display of the vector map takes several seconds. This speed advantage is significant because processing efficiency is an important objective of any software-based apparatus. As many computer users will attest, repeated processing delays of several seconds can be quite frustrating, especially when time is of the essence.

Figure 5:
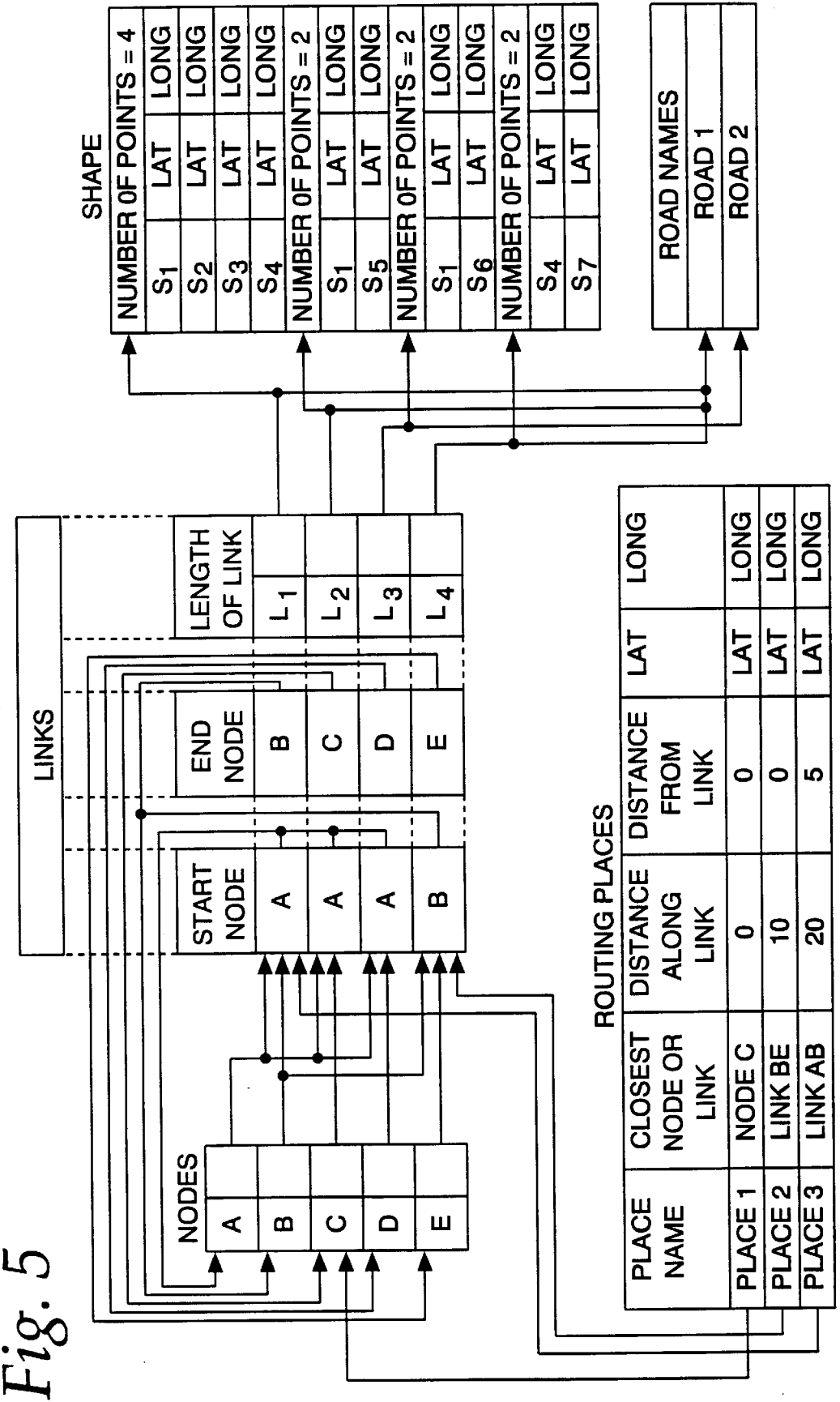
FIG. 5 is a data structure diagram for the routing database of the automated travel planning apparatus of FIG. 2.

The routing database 30 is created from the same GIS data used to create the bit-mapped images in the map database 26. As discussed later, this allows one to easily correlate a generated route with a selected bit-mapped image so that the route can be displayed over the bit-mapped image at the correct position. The data structure of the routing database 30 is illustrated in FIG. 5 with sample data corresponding to the road network depicted in FIG. 6. Generally, the routing database 30 has stored therein node data, link data, shape data, routing places data, and road name data. The node data is organized with an entry for each node in the road network. Similarly, the link data is organized with an entry for each link in the road network. A given node entry points to those links which include the given node, and a given link entry points to the start and end nodes which form the link. Thus, with respect to the sample data in FIG. 5 and the corresponding road network in FIG. 6, there are five nodes A, B, C, D, and E in the road network and four links AB, AC, AD, and BE containing those nodes. Node A points to all links containing node A; that is, node A points to links AB, AC, and AD. Furthermore, node B points to links AB and BE, node C points to link AC, node D points to link AD, and node E points to link BE. Each of the links AB, AC, AD, and BE point to the nodes which form the link. Thus, link AB points to nodes A and B, link AC points to nodes A and C, link AD points to nodes A and D, and link BE points to nodes B and E.

The shape data is organized into sets of shape point entries for each link entry. A given link entry points to a shape entry indicating the number of shape points in the link. The link has two shape points corresponding to the end points of the link, and has additional shape points for turns within the link. Following the entry for the number of shape points in the given link are entries for each shape point in the given link, along with the lat/long of each shape point. Thus, in the example shown in FIGS. 5 and 6, the link AB points to an entry having the number four stored therein to indicate that the link AB contains four shape points. Following this number entry are four entries for the four shape points S1, S2, S3, and S4 contained within the link AB, a certain lat/long being associated with each shape point. Similarly, the link AC points to an entry containing the number two, followed by entries for the shape points S1 and S5. The link AD points to an entry containing the number two, followed by entries for the shape points S1 and S6. Finally, the link BE points to an entry containing the number two, followed by entries for the shape points S4 and S7.

The routing database 30 also contains routing places data indicating the geographic location of cities, towns, etc. The routing places data includes fields for the "place names", "closest node or link", "distance along link", "distance from link", and "lat/long" of the places. With respect to the "closest node or link" field, a given place points to a node if a given place is geographically located at a stored node, while the place points to the closest link if the place does not geographically coincide with any stored node. If the place is located at a stored node, the "distance along link" and the "distance from link" are zero. If the place is located on a link, the "distance along link" is the distance between the place and one of the two end nodes of the link. The end node used to calculate the "distance along link" is arbitrarily chosen. If the place is located away from both a stored node and link, the "distance from link" is the shortest distance between the place and its closest link. This shortest distance is found by extending a line from the given place to the closest link where the line is perpendicular to the closest link at the point of intersection (see FIG. 4). The "distance along link" is then found by calculating the distance between the point of intersection and one of the two end nodes of the link. The distance values are any geographic form of measurement such as miles, meters, etc.

Figure 6:
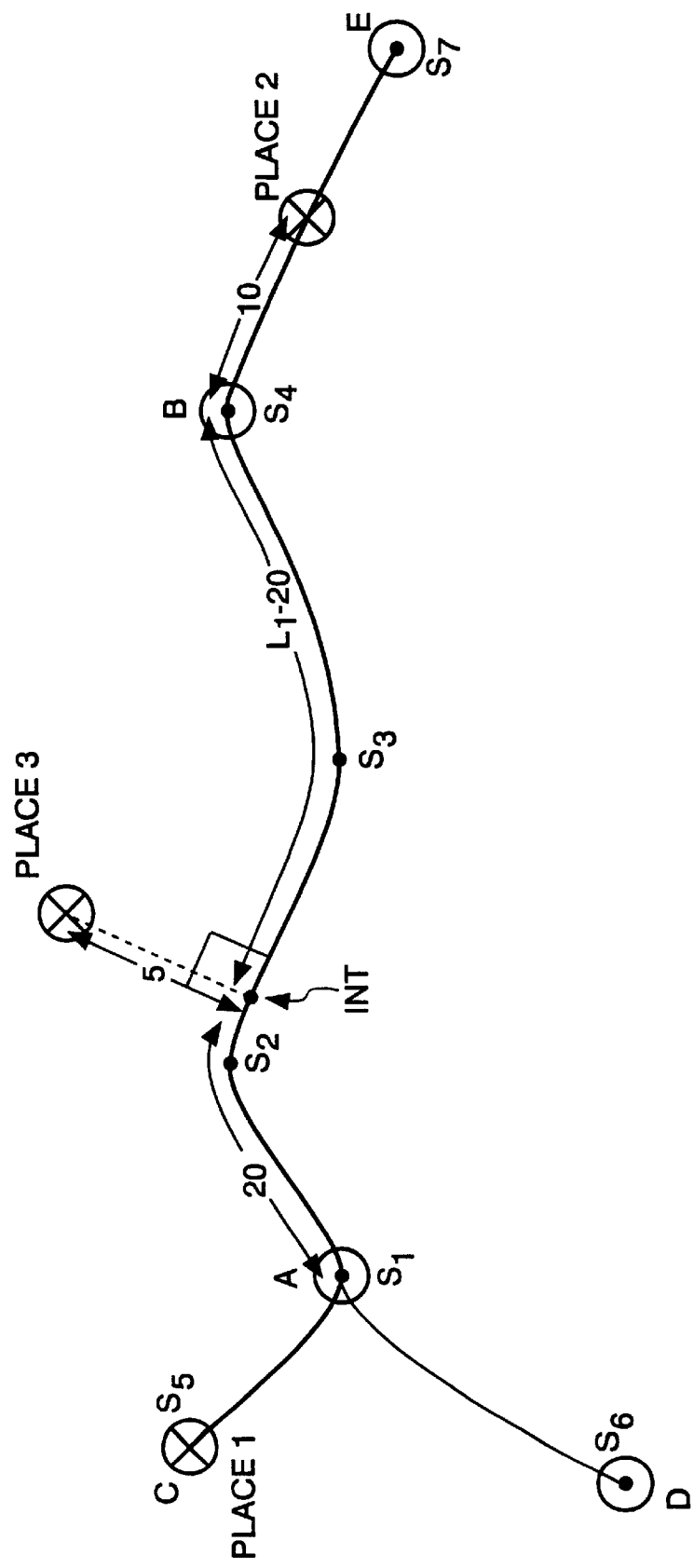
FIG. 6 is a road network diagram associated with the sample data in the data structure of FIG. 5.

The road name data includes an entry for each road of the road network in FIG. 6. Each link in the routing database 30 points to the road on which the link is located. The road network is illustrated with two roads; road 1 being shown as a thick line connecting nodes C, A, B, and E, and road 2 being shown as a thin line connecting nodes D and A. Therefore, links AB, AC, and BE point to road 1, while link AD points to road 2.

FIGS. 5 and 6 illustrate three possibilities for the geographic location of a place relative to a road network. First, a place may be located directly at a node. In particular, PLACE 1 is located at node C and, therefore, points to node C. Since PLACE 1 is located directly at a node, the entries for "distance along link" and "distance from link" are zero. Second, a place may be located away from a node but directly along a link. In the example, PLACE 2 is geographically located off of a node and, therefore, the entry for "closest node or link" is a link, which in this case is link BE. Since PLACE 2 is located directly on link BE, the value for "distance from link" is zero. The value for "distance along link" is the distance from either node B or node E (node B in FIG. 6), arbitrarily shown to be ten in FIGS. 5 and 6. Finally, a place may be located off of any stored node or link. In this situation, represented by PLACE 3, the values for "distance along link" and "distance from link" are some nonzero value, arbitrarily shown to be twenty and five, respectively, in FIG. 5.

Figure 7:
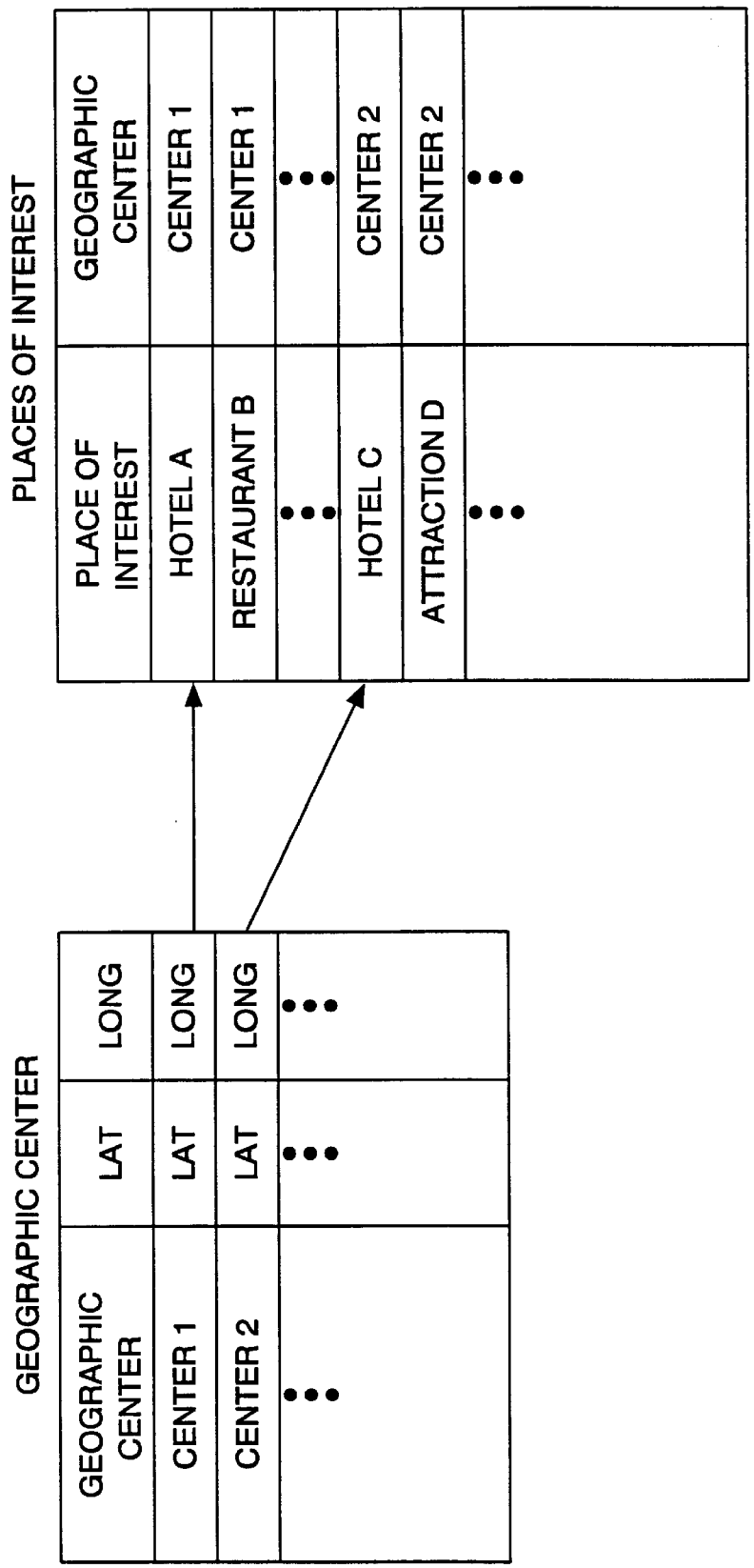
FIG. 7 is a data structure diagram for the places of interest database of the automated travel planning apparatus of FIG. 2.

The places of interest database 34 is organized with the data structure depicted in FIG. 7. The data structure contains both places of interest data and geographic center data. The places of the interest data includes fields for "place name" and "geographic center". The "place name" contains the name of a place of interest, such as a hotel, restaurant, attraction, etc. Each "place name" is associated with a "geographic center", such as a city. Each places of interest entry points to a geographic center entry containing both the geographic center associated with the place of interest and the lat/long of the geographic center. The geographic center for a given place of interest is generally the city with which the place of interest is most commonly associated. This data structure effectively groups places of interest based on geographic location by "geocoding" each place of interest to the lat/long of a geographic center located near the place of interest. "Geocoding" is the assignment of a lat/long to a geographic location. Thus, in the example shown in FIG. 7, hotel A and restaurant B are associated with center 1, and the geographic center entry for center 1 points to the first places of interest entry associated with center 1, i.e., the entry for hotel A. Similarly, hotel C and attraction D are associated with center 2, and the geographic center entry for center 2 points to the entry for hotel C. There may, of course, be hundreds of places of interest associated with a given geographic center.

The functions performed by the processor 38 employ the data stored in the map database 26, the routing database 30, and the places of interest database 34. As previously stated, the functional components of the processor 38 include the map selection component 42, the routing component 46, and the place selection component 50. In response to user selection of a map name at the user interface 14, the map selection component 42 retrieves the file associated with the selected map name and causes the bit-mapped image stored in that file to be displayed on the display monitor 18. In the display process, the map selection component 42 reads the "initial display coordinates" field of the map database so that the upper left corner of the display screen corresponds to the bit map coordinates X, Y.

In response to user selection of a departure point and a destination point at the user interface 14, the routing component 46 of the processor 38 generates a travel route between the selected departure and destination points and draws the generated route over the bit-mapped image on the display monitor 18. More specifically, when a user selects a departure point, the routing component 46 searches for the departure point in the "place name" field of the routing places data in the routing database 30. If the departure point matches any "place name", then the routing places data in FIG. 5 associated with that "place name" is saved for later use. If the departure point does not match any "place name", then the routing component 46 provides the user with a list of similarly-spelled place names on the display monitor 18, from which the user may select a desired departure point.

Following selection of a departure point, the user selects a destination point. Once again, the routing component 46 searches the routing database 30 to find a match with the selected departure point. If a match is found between the selected departure point and a "place name" in the routing database 30, then the routing places data associated with the "place name" is saved for later use. If no match is found, the user is provided with a list of similarly-spelled place names from which to select a desired destination point. Since a route requires at least two selected points, failure of the user to select both a departure point and a destination point will cause the routing component 46 to prompt the user for an additional place selection.

After the user has selected a departure point and at least one destination point, the user may still select additional destination points. The routing component 46 will generate routes between the selected points in the order they are selected. Thus, if a user successively chooses a departure point, a destination point A, and a destination point B, then the routing component 46 will generate routes between the departure point and the destination point A, and between the destination point A and the destination point B.

In response to user selection of a departure point and at least one destination point, the routing component 46 determines a travel route between the departure point and the destination point using an implementation of Dijkstra's shortest path algorithm. In order to apply Dijkstra's algorithm, a departure node associated with the departure point and a destination node associated with the destination point are defined. If the departure point is located at a stored node, then that node is the departure node. If the departure point is located away from stored nodes, but along a link, then the departure node is the departure point itself. Finally, if the departure point is located away from both stored nodes and links, then the departure node is the point of intersection found by extending a line from the departure point perpendicular to the closest link. The destination node associated with the destination point is defined in the same manner.

Since Dijkstra's algorithm is well-known to the art, it will not be described in detail herein. It suffices to say that to find the shortest path between a departure point and a destination point, the algorithm begins at the departure node and spreads out through the road network of nodes and links stored in the routing database 30, adding nodes to a saved list of nodes that we have found the shortest path to, until the destination node is included in this list of nodes. In applying Dijkstra's algorithm, the routing component 46 determines distances between nodes by reading the field "length of link" in the link data in FIG. 5. If the departure node, however, is located along a link but away from a stored node, then the "distance along link" field of the routing places data in FIG. 5 is used in combination with the "length of link" field to determine distances directly around the departure node. In particular, the distance between the departure node and one of the two nodes of the link is determined by reading the "distance along link". The distance between the departure node and the other of the two nodes of the link is determined by subtracting the "distance along link" from the "length of link" of the link data. The "distance along link" field is used in the same fashion for determining distances to a destination node which is located along a link but away from a stored node. Dijkstra's algorithm is described in greater detail in Chapter 9 of the book INTRODUCTION TO DATA STRUCTURES by Bhagat Singh and Thomas L. Naps, published in 1985 by West Publishing Co., which is incorporated herein by reference.

After the route is generated by the routing component 46, the routing component 46 creates textual directions for travel between the departure and destination points. In creating the textual directions, all links along the generated route pointing to a single road name in the routing database 30 are combined into one textual direction. The textual directions provide travel instructions beginning from the departure point and ending with the destination point, and there is one textual direction for each road name along the generated route.

Next, the routing component 46 determines the shape of the generated route using the shape data in FIG. 5. The routing component 46 collects all the links along the generated route and, for each link, retrieves the associated shape points. If a departure or destination point is located at a node or along a link, then that point is also retrieved as a shape point. If a departure or destination point is located away from both nodes and links, then both that point and the point of intersection (INT in FIG. 6) formed by extending a perpendicular line from the departure or destination point to the closest link are also retrieved as shape points. In this manner, the routing component 46 retrieves all of the shape points along the generated route.

Referring back to FIG. 6, if, for example, the generated route extends from place 1 to place 2 via the links AC, AB, and part of BE, then the routing component 46 retrieves the shape points S5, S1, S2, S3, S4, and place 2 in an order corresponding to the direction of the generated route. Similarly, if the generated route extends from place 1 to place 3 via AC, part of AB, and the perpendicular line, then the routing component 46 retrieves the shape points S5, S1, S2, INT, and place 3, in that order.

The routing component 46 uses the shape points to draw the generated route over the bit-mapped image on the display monitor 18. In particular, as shown in FIG. 5, a given shape point is associated with lat/long coordinates. In order to properly position the shape point over the bit-mapped image on the display monitor 18, the routing component 46 performs the following operations which are depicted in the flowchart in FIG. 8. First, at step 54, the routing component 46 reads from the memory file associated with the displayed bit-mapped image (FIG. 3) the lat/long of the upper left (ul) and lower right corners of the bit-mapped image and the map projection used for the bit-mapped image. Next, at step 58, the routing component 46 converts the lat/long of the upper left and lower right corners of the bit-mapped image into projection units using the received map projection. Projection units are those units obtained by applying a map projection to a lat/long.

Figure 8:
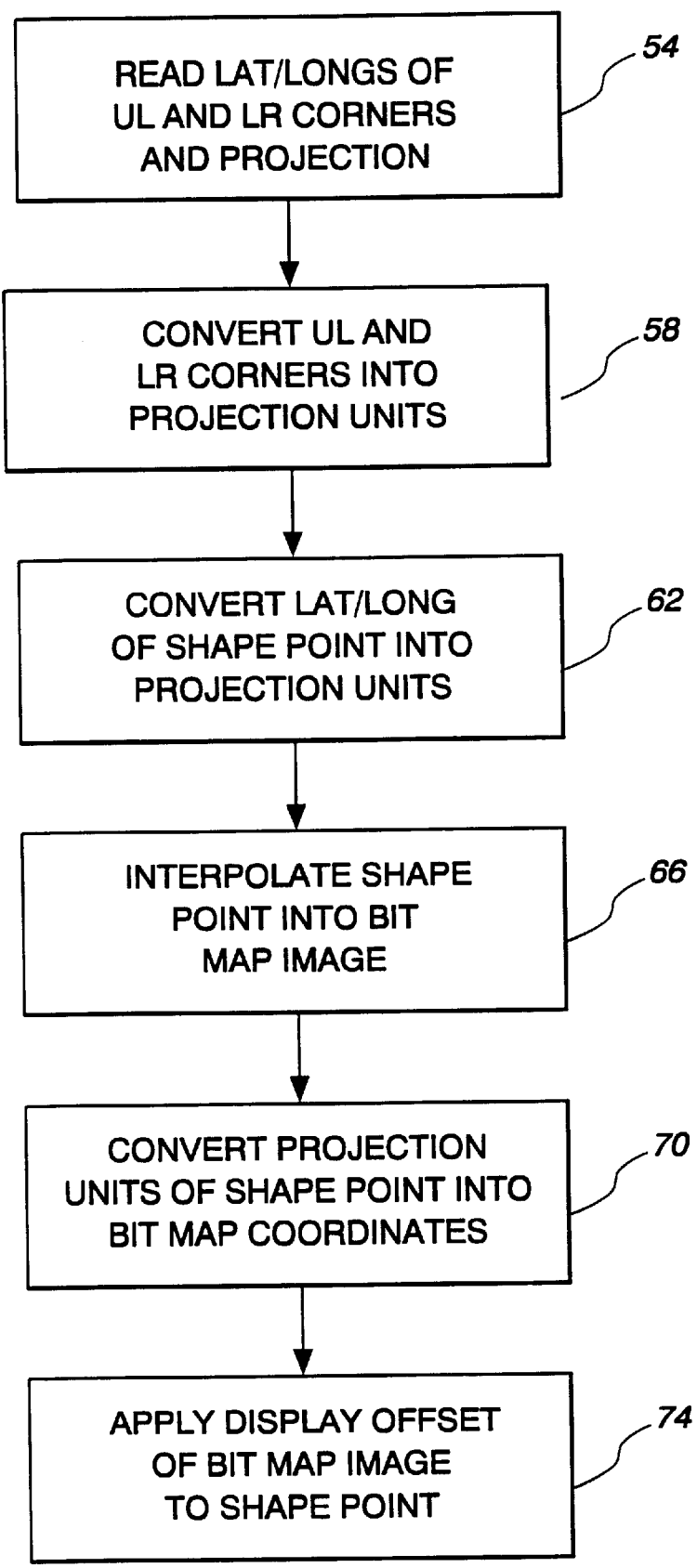
FIG. 8 is a flowchart showing the operation of displaying a shape point over a bit-mapped image on a display monitor, performed by the routing component of FIG. 2.

At step 62, the routing component 46 converts the lat/long of the given shape point into projection units using the same standard map projection used at step 58. At step 66, the routing component 46 interpolates the given shape point (in both the X and Y directions) within the bit-mapped image by calculating a ratio between the projection units associated with the given shape point and the projection units associated with upper left and lower right map corners. At step 70, this ratio is multiplied by the size of the bit-mapped image (in both the X and Y directions) to convert the projection units of the given shape point into bit map coordinates. Finally, at step 74, the routing component 46 reads the "initial display coordinates" of the bit-mapped image (see FIG. 3), and offsets the shape point by the amount of the "initial display coordinates" to obtain the pixel position of the shape point on the displayed bit-mapped image. The operations in FIG. 8 are performed for each shape point along the calculated route.

After all the shape points are collected and converted into properly offset bit map coordinates, the routing component 46 generates a video line on the display monitor, which connects the shape points, by calling a Microsoft® Windows™ drawing function such as "Polyline". The video line represents the generated travel route between the selected departure point and the selected destination point. The video line overlays the bit-mapped image on the display monitor and is properly positioned relative to the bit-mapped image because both the bit-mapped image and the video line are created from the same GIS database and using the same map projection. In particular, the video line is composed of shape points associated with lat/long coordinates originally taken from the GIS database. Similarly, the bit-mapped image is a snap-shot of a vector map generated from shape information contained from the same GIS database.

In the preferred embodiment, the travel route is displayed using an "inverse video" line, i.e., a video line which changes each pixel along the route to the opposite color. The opposite color of a given pixel is obtained by displaying the color having an opposite RGB (Red, Green, Blue) value to the given pixel. The opposite RGB value is determined by the graphical user interface, which is preferably Windows™. Alternatively, the route may be displayed using any other color transformation for the pixels along the route. For example, the pixels along the route may be transformed into a solid color, a lighter color, or a darker color.

Moreover, the travel route is preferably displayed with a video line having a width which is slightly wider than the widest road along the route. This insures that the video line completely overlays the roads which form the route. Also, the travel route is displayed with the departure and destination points having enlarged dots formed thereon so that these points are clearly visible to the user. This effect is created by calling the Microsoft® Windows™ function "Ellipse", which highlights pixels within a fixed radius of the departure and destination points. Alternatively, after the display pixel positions of the departure and destination points are obtained, several pixel positions located near the departure and destination points are added as shape points. When the displayed line traverses these added pixel positions, a large dot is formed around the departure and destination points.

Not only is the generated travel route displayed on the display monitor 18, but it may also be sent to the printer 22 (FIG. 1) for printing. The travel route, along with the underlying bit-mapped image, may be printed as follows. First, in response to user selection of a print option via the user interface 14, the bit-mapped image is selected into a memory DC (device context), i.e., a block of memory organized like a bit map. Second, the routing component 46 draws the travel route to the memory DC. Since the travel route is now being drawn to the memory DC, as opposed to the display monitor 18, the routing component 46 does not apply the display offset between the bit-mapped image and the display monitor 18 to the shape points along the travel route following their projection into bit map coordinates. That is, step 74 in FIG. 8 is skipped when the travel route and underlying bit-mapped image are printed. However, all of the other operations in FIG. 8 are still performed by the routing component 46. Next, the routing component 46 calculates the width and height of the printable area in printer pixels so as to maintain the aspect ratio of the bit-mapped image while covering as much of the printable area as possible. Finally, Microsoft® Windows™ provides a built-in "StretchBlt" call which performs a bit-block transfer of the travel route and bit-mapped image from the memory DC to a printer DC so that the printer 22 may print the travel route and bit-mapped image.

Alternatively, a displayed travel route and bit-mapped image may be printed by user selection of "Print Screen" via the user interface 14, which stores the travel route and bit-mapped image into a "Clipboard" under Microsoft® Windows™. The user then enters a drawing application such as Microsoft® Windows™ PAINTBRUSH and "pastes" the travel route and bit-mapped image from the "Clipboard" to PAINTBRUSH. By selecting a print option, the pasted travel route and bit-mapped image are printed from PAINT-BRUSH.

Figure 9:
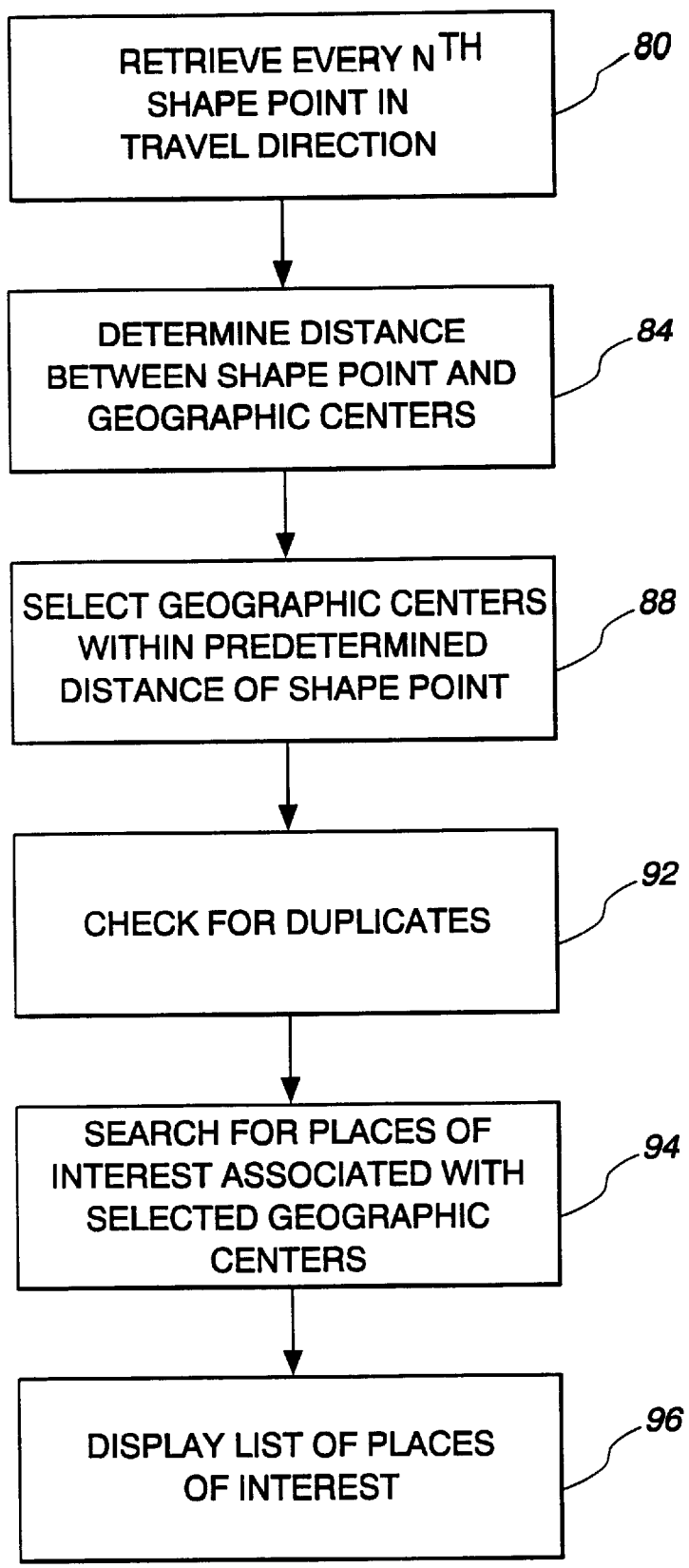
FIG. 9 is a flowchart showing the operation of displaying a list of places of interest near a generated route, performed by the place selection component of FIG. 2.

After the generated route is highlighted over the bit-mapped image on the display monitor 18, the user may request via the user interface 14 a list of places of interest which are geographically located near the displayed route. In response to such a request, the place selection component 50 performs the operations shown in the flowchart in FIG. 9 to determine which places of interest are located near the displayed route. First, at step 80, the place selection component 50 successively retrieves every Nth shape point along the route, in the direction of travel, where N is typically greater than one. As previously stated, the shape points along the route were collected by the routing component 46 prior to displaying the route on the display monitor 18. At step 84, for every Nth shape point, the place selection component 50 determines the distance between the shape point and all of the geographic centers in the places of interest database 34. Given a shape point with a lat/long of lat1, long1 and a geographic center with a lat/long of lat2, long2, the standard arc-distance function for calculating the distance between lat1, long1 and lat2, long2 is the following:

$$\text{Distance}=\text{RADIUS}*(2*\text{asin}((\text{sqrt}(((\cos(\text{lat2})*\cos(\text{lng2}))-\\(\cos(\text{lat1})*\cos(\text{lng1})))^2+((\cos(\text{lat2})*\sin(\text{lng2}))-\\(\cos(\text{lat1})*\sin(\text{lng1})))^2+(\sin(\text{lat2})-\sin(\text{lat1}))^2)*\text{RADIUS})/\\(2*\text{RADIUS})))$$

where
  RADIUS=the radius of the earth, and
  asin=the arcsine function.

At step 88, the place selection component determines which geographic centers are located within a predetermined distance of the shape point. At step 92, for each geographic center located within the predetermined distance of the shape point, the geographic center is compared to the geographic centers selected with previous shape points so that the same geographic center is not chosen twice. If a geographic center is a duplicate of a previously selected geographic center, then it is not chosen a second time. At step 94, the place selection component 50 searches the places of interest database 34 for places of interest associated with the selected geographic centers. At step 96, the place selection component 50 generates on the display monitor 18 a list of those places of interest associated with the selected geographic centers.

The foregoing operations of the place selection component 50 have several advantages. First, places of interest are grouped around geographic centers and the place selection component 50 calculates the distance between every Nth shape point and the geographic centers, as opposed to calculating the distance between every Nth shape point and all the places of interest. This improves the processing efficiency of the place selection component 50. Second, by taking every Nth shape point instead of every shape point at steps 80 and 84, the processing efficiency of the place selection component 50 is increased because a distance comparison is not performed for every shape point. Third, since at step 80 the place selection component 50 retrieves the Nth shape points in an order corresponding to the direction of travel along the route, as opposed to some other order, the generated list of places of interest is already ordered in accordance with the direction of travel. The place selection component 50 does not have to re-order the generated list of places of interest to correspond to the direction of travel. Generating the list to correspond to the direction of travel is preferable because it allows a user to more easily understand the list.

Figure 10:
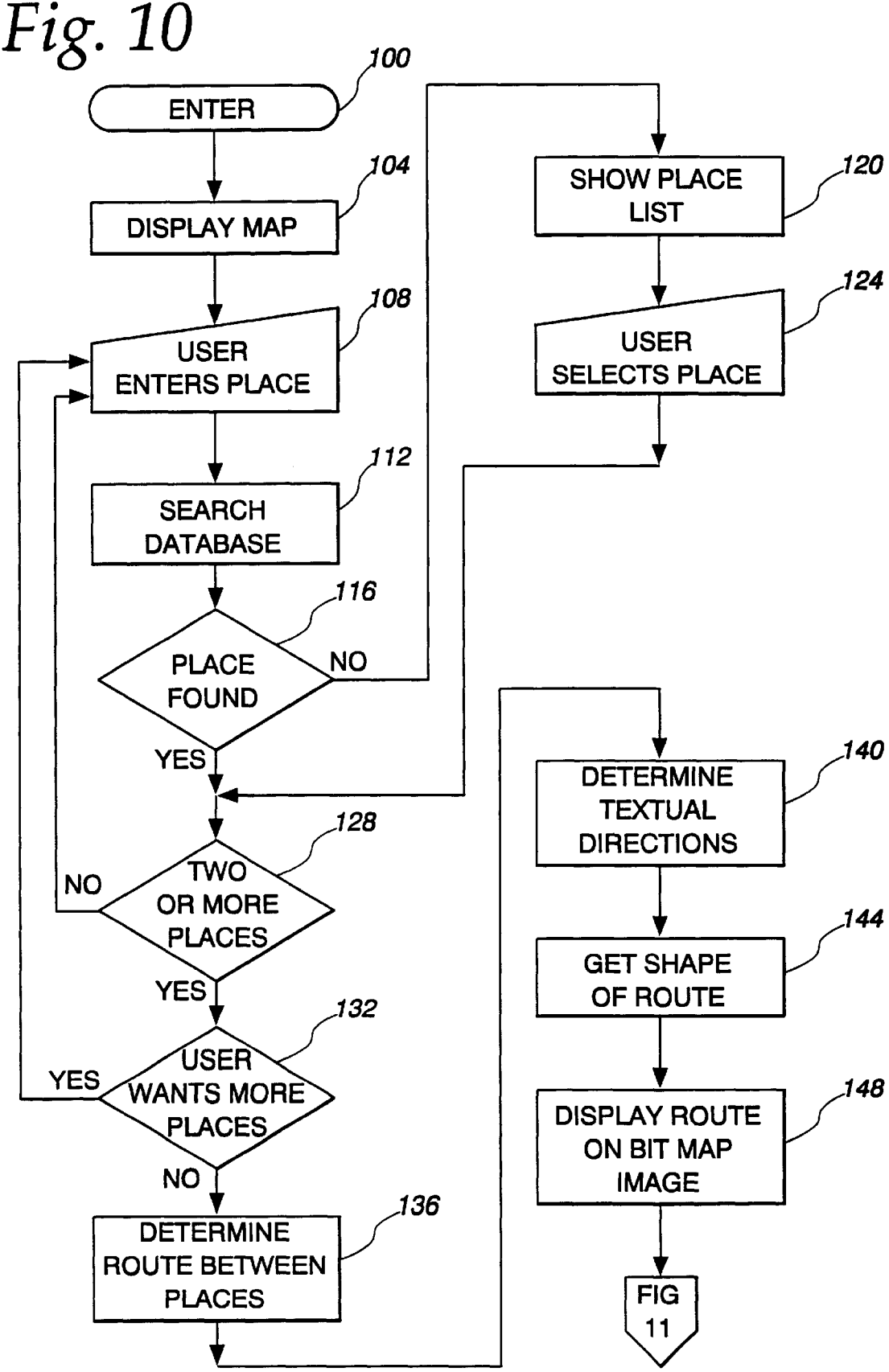
FIGS. 10 and 11 are flowcharts showing the overall operation of the automated travel planning apparatus of FIG. 2.

The overall operation of the automated travel planning apparatus will now be described by reference to the flowchart in FIGS. 10 and 11. After a user initiates operation of the automated travel planning system at step 100, the map selection 42 component automatically displays a bit-mapped image on the display monitor 18, such as a bit-mapped image of a country (step 104). At step 108, the user selects a departure point via the user interface 14, and the routing component 46 searches the routing database 30 for the selected departure point (step 112).

If the selected departure point is not found in the routing database 30 at step 116, the routing component 46 generates a list of similar place names on the display monitor 18 at step 120. At step 124, the user proceeds to select a departure point from the displayed list using the user interface 14. After a user has correctly selected a departure point, the user selects a destination point in the same manner. After the user has correctly selected both a departure point and a destination point (step 128), the user may select additional destination points at step 132.

After the user has completed selection of departure and destination points, the routing component 46 determines the route between the departure point and the first selected destination point, and between the first selected destination point and any additional selected destination points (step 136). In addition, the routing component 46 determines the textual directions for travel between the selected points (step 140). At step 144, the routing component 46 collects the shape points from the routing database 30 for all the links which form the calculated route. From these shape points, the routing component 46 generates a video line, over the bit-mapped image on the display monitor 18, which corresponds to the calculated route (step 148).

Figure 11:
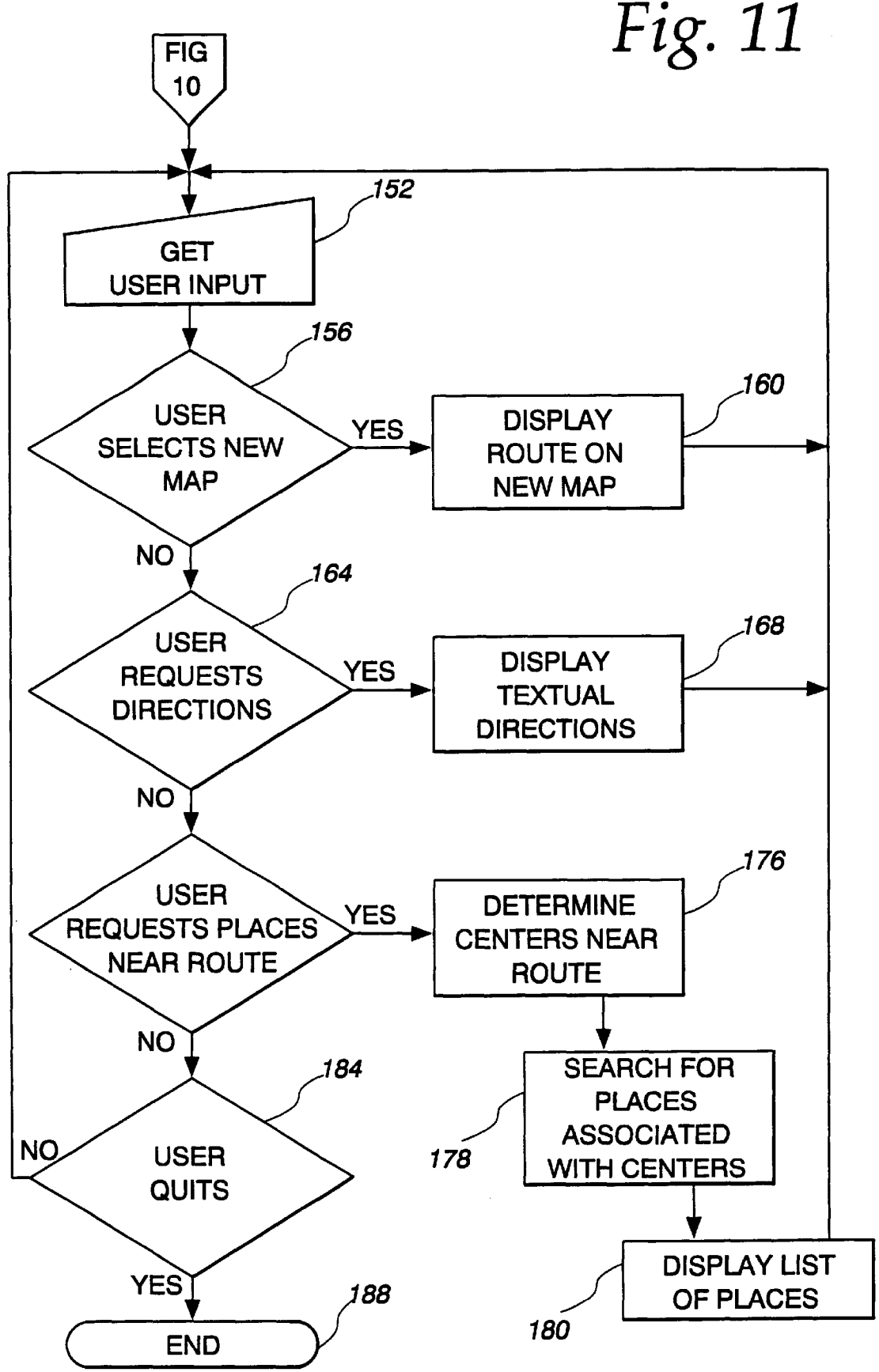

As illustrated in FIG. 11, following display of the calculated route, the user has several options at step 152. First, the user may select another bit-mapped image from the map database 26 (step 156), and the routing component 46 will generate a new video line over the selected bit-mapped image corresponding to the calculated route (step 160). Second, the user may request the textual directions (step 164), and the routing component 46 will display on the display monitor 18 the previously generated list of textual directions (step 168). Third, the user may request a list of places of interest geographically located near the calculated route (step 172). In response to this request, the place selection component 50 determines which geographic centers are located within a predetermined distance of the calculated route (step 176), searches the places of interest database 34 for the places of interest associated with those geographic centers (step 178), and displays a list of those places of interest (step 180). Finally, the user may quit (step 184), which terminates operation of the automated travel planning apparatus (step 188).

While the present invention has been described with reference to one or more particular embodiment, those skilled in the art will recognize that many changes may be made thereto without departing from the spirit and scope of the present invention. The following claims set forth the scope of the present invention.

What is claimed is:

1. A method for displaying a travel route, the method comprising the steps of:

providing a user interface for receiving user input;

generating a bit-mapped image of a geographic region from vector data;

displaying the bit-mapped image on a display monitor;

generating a routing database from the vector data, the routing database having geographic information for roads and places within the geographic region;

selecting, via the user interface, a departure point and a destination point geographically located within the geographic region;

using the routing database generated from the vector data to generate a travel route between the selected departure point and the selected destination point; and displaying a video line, representing the travel route, on the display monitor over the bit-mapped image of the geographic region by drawing the video line through pixel points derived from the vector data.

2. The method of claim 1, further including the step of printing the travel route on a printer over a printed bit-mapped image of the geographic region.

3. The method of claim 1, further including the steps of:

providing a places of interest database having geographic center data indicating the geographic locations of geographic centers within the geographic region and places of interest data associating places of interest with the geographic centers;

selecting geographic centers from the places of interest database which are geographically located within a predetermined distance of the generated travel route; and generating a list of places of interest associated with the selected geographic centers.

4. The method of claim 1, wherein the pixel points include shape points derived from the vector data.

5. A method for generating a list of places of interest geographically located near a travel route, the method comprising the steps of:

providing a user interface for receiving user input;

providing a routing database having geographic information for roads and places within a geographic region;

providing a places of interest database having geographic center data indicating the geographic locations of geographic centers within the geographic region and places of interest data associating groups of the places of interest with respective nearby ones of the geographic centers;

selecting, via the user interface, a departure point and a destination point geographically located within the geographic region;

using the routing database to generate a travel route between the selected departure point and the selected destination point;

selecting geographic centers from the places of interest database which are geographically located within a predetermined distance of the generated travel route; and generating a list of places of interest associated with the selected geographic centers.

6. The method of claim 5, further including the step of displaying the generated list of places of interest on a display monitor.

7. A method for generating a list of places of interest geographically located near a travel route, the method comprising the steps of:

providing a user interface for receiving user input;

providing a routing database having geographic information for roads and places within a geographic region;

providing a places of interest database having geographic center data indicating the geographic locations of geographic centers within the geographic region and places of interest data associating each place of interest with one of the geographic centers;

selecting, via the user interface, a departure point and a destination point geographically located within the geographic region;

using the routing database to generate a travel route between the selected departure point and the selected destination point by generating the travel route from shape points stored in the routing database;

selecting geographic centers from the places of interest database which are geographically located within a predetermined distance of the generated travel route by retrieving a predetermined number of the shape points in an order corresponding to the direction of the travel route and selecting geographic centers from the places of interest database which are geographically located within a predetermined distance of the retrieved shape points, and generating a list of places of interest associated with the selected geographic centers.

8. An automated travel planning apparatus, comprising:

display means for displaying a bit-mapped image of a geographic region, the bit-mapped image being generated from vector data;

a routing database having geographic information for roads and places within the geographic region, the routing database being generated from the vector data;

a user interface for selecting a departure point and a destination point geographically located within the geographic region; and routing means for generating a travel route between the selected departure point and the selected destination point using the routing database generated from the vector data and for displaying a video line, representing the generated travel route, over the bit-mapped image on the display means, the video line being drawn through pixel points derived from the vector data.

9. The automated travel planning apparatus of claim 8, further including printer means for printing the travel route over a printed bit-mapped image of the geographic region.

10. The automated travel planning apparatus of claim 8, further including a places of interest database having geographic center data indicating the geographic locations of geographic centers within the geographic region and places of interest data associating places of interest with the geographic centers; and place selection means for selecting geographic centers from the places of interest database which are geographically located within a predetermined distance of the generated travel route, and for generating a list of places of interest associated with the selected geographic centers.

11. The automated travel planning apparatus of claim 8, further including a map database having a plurality of bit-mapped images of geographic regions stored therein, and a map selection means for selecting at least one of the plurality of bit-mapped images for display on the display means.

12. The automated travel planning apparatus of claim 8, wherein the pixel points include shape points derived from the vector data.

13. An automated travel planning apparatus, comprising:

a routing database having geographic information for roads and places within a geographic region;

a places of interest database having geographic center data indicating the geographic locations of geographic centers within the geographic region and places of interest data associating groups of the places of interest with respective nearby ones of the geographic centers;

a user interface for selecting a departure point and a destination point geographically located within the geographic region;

routing means for using the routing database to generate a travel route between the selected departure point and the selected destination point; and place selection means for selecting geographic centers from the places of interest database which are geographically located within a predetermined distance of the generated travel route, and for generating a list of places of interest associated with the selected geographic centers.

14. The automated travel planning apparatus of claim 13, further including display means for displaying the generated list of places of interest.

15. An automated travel planning apparatus, comprising:

a routing database having geographic information for roads and places within a geographic region;

a places of interest database having geographic center data indicating the geographic locations of geographic centers within the geographic region and places of interest data associating each place of interest with one of the geographic centers;

a user interface for selecting a departure point and a destination point geographically located within the geographic region;

routing means for using the routing database to generate a travel route between the selected departure point and the selected destination point, the routing means generating the travel route from shape points stored in the routing database; and place selection means for selecting geographic centers from the places of interest database which are geographically located within a predetermined distance of the generated travel route, and for generating a list of places of interest associated with the selected geographic centers, the place selection means retrieving a predetermined number of the shape points in an order corresponding to the direction of the travel route and selecting geographic centers from the places of interest database which are geographically located within a predetermined distance of the retrieved shape points.

* * * * *